July 3, 1934.  B. R. WELLINGTON  1,965,017
CALCULATING DEVICE
Filed April 11, 1933  2 Sheets-Sheet 1
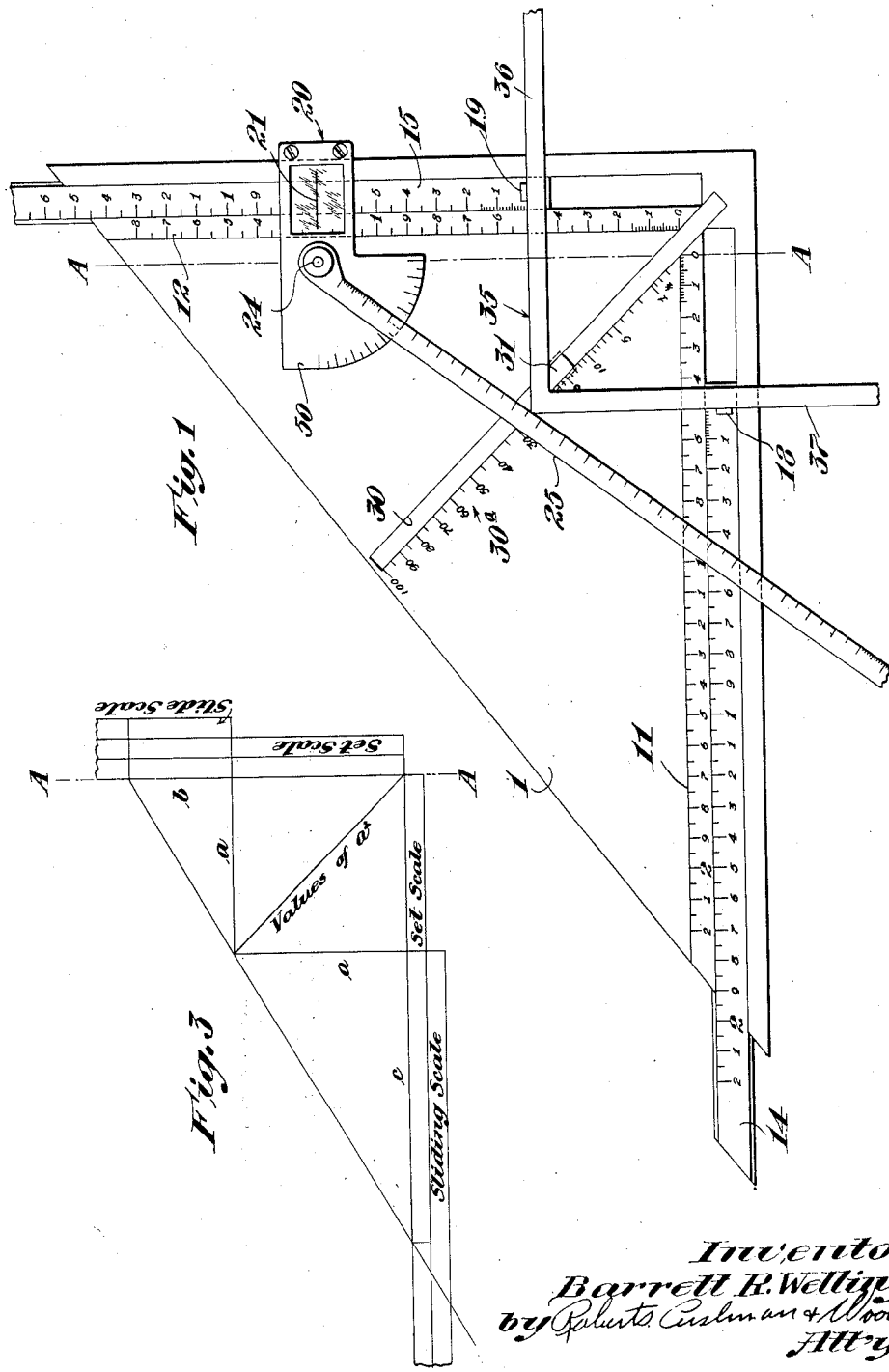

July 3, 1934.  B. R. WELLINGTON  1,965,017
CALCULATING DEVICE
Filed April 11, 1933   2 Sheets-Sheet 2
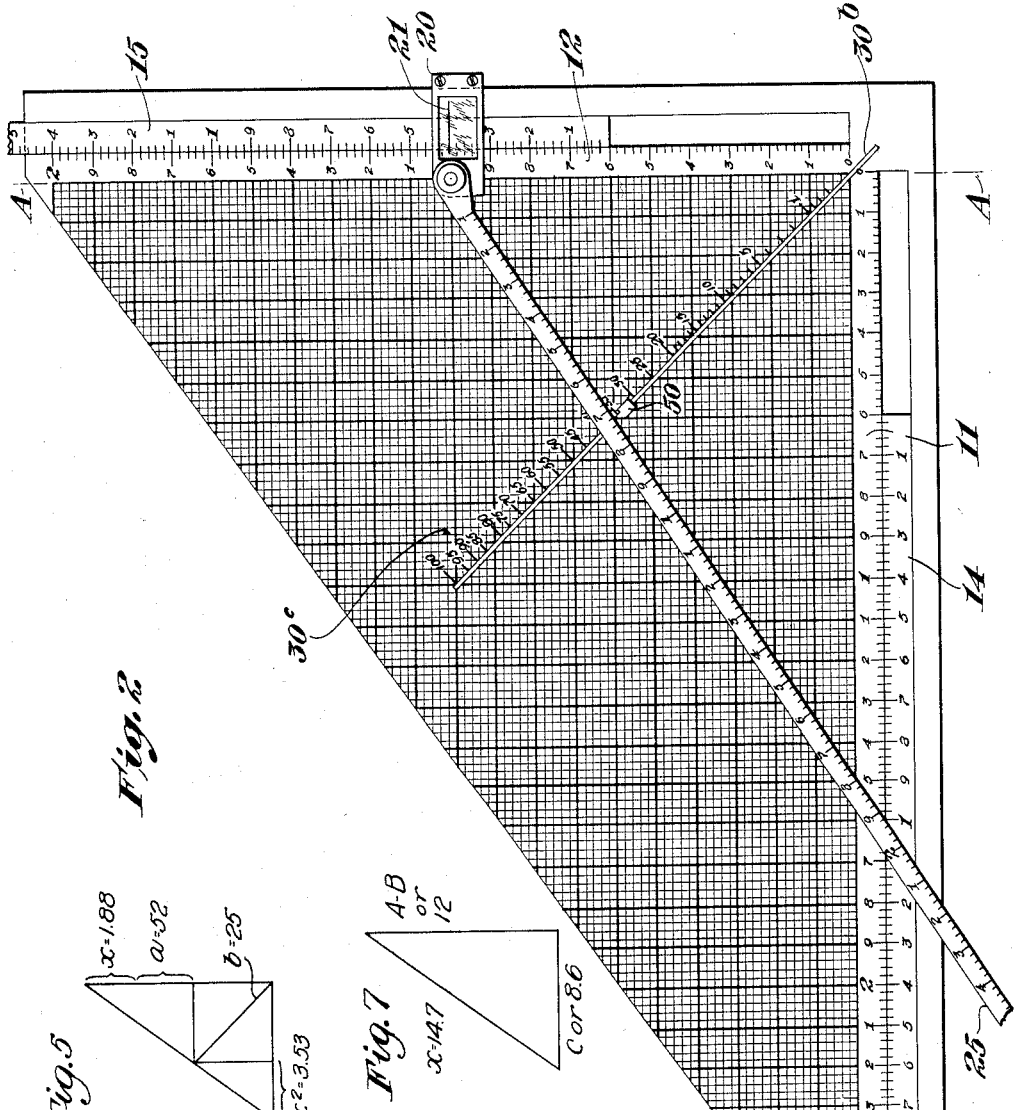
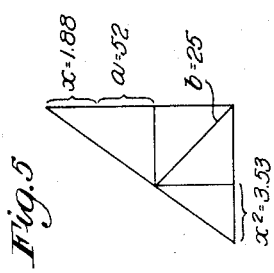
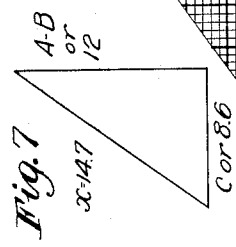
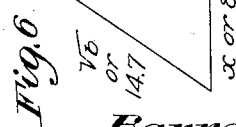
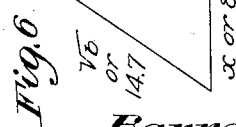
Inventor
Barrett R. Wellington
by Roberts, Cushman & Woodberry
Att'ys.

Patented July 3, 1934

1,965,017

UNITED STATES PATENT OFFICE

1,965,017

CALCULATING DEVICE

Barrett R. Wellington, Troy, N. Y.

Application April 11, 1933, Serial No. 665,570

9 Claims. (Cl. 235—61)

This invention relates to an improved calculating apparatus adapted to facilitate the ready solution of a wide variety of problems and affording answers having accuracy within sufficiently close limits to meet the ordinary requirements for engineering calculations or the like, as well as to afford approximate checks on more accurate and laborious types of solutions.

In general, the present invention affords an improved and simplified type of apparatus of the same general character as disclosed in my copending application Serial No. 595,690, filed February 29, 1932. Such a device provides a swinging hypotenuse associated with fixed and sliding scales which cooperate to define a right triangle and is provided with a sliding square arranged to move along the bisector of the right angle of the triangle, and having legs cooperating with the adjoining portion of the hypotenuse and the other sides of the large triangle to define smaller triangles, so that the apparatus in effect defines a large right triangle and two small right triangles similar to each other and to the large triangle, as well as a square. That application discloses a sliding diagonal member movable along the bisector of the right angle of the large triangle, this diagonal being provided with a scale to indicate the squares of terms designated on the scales at the sides of the large triangle.

The present invention, while permitting the solution of a substantial proportion of the problems solved by the device of my prior application, affords a somewhat simplified and less expensive device, avoiding the necessity of providing a sliding diagonal scale, but providing instead a sliding element to engage the hypotenuse and a fixed scale indicating the squares and disposed adjoining the path of said element. In accordance with this invention, a square may be provided to facilitate the readings at the point of intersection of the hypotenuse and the bisector of the large triangle, or suitable markings upon the fixed portion of the device may be employed for the purpose.

A device of this character is advantageous in solving a large variety of algebraic equations such as cubic equations or equations involving higher powers of unknown quantities, certain types of quadratic equations, simultaneous equations and equations providing various involved expressions, and in addition a device of this character may provide the ready solution of problems involving arithmetical relationships such as addition, subtraction, multiplication and division; the reduction of fractions to their lowest terms as well as the determination of certain trigonometric functions and relationships, the determination of reciprocals and the solution of problems involving vector analysis, as explained more fully in my copending application identified above, which is incorporated by reference herein.

The swinging hypotenuse and the horizontal and vertical scales at the bottom and sides of the frame of my device cooperate to define a large right triangle, while the bisector of the right angle of this triangle extended to its point of intersection with the edge of the hypotenuse defines the intersecting point of lines at right angles to each other and parallel to the sides of the right triangle to cooperate with these sides in defining a square, the diagonal of which is provided by said bisector. A smaller triangle is defined by the upper part of the swinging hypotenuse, the horizontal line extending from said point of intersection, and that part of the vertical side of the large triangle which is disposed above said line. A third triangle is defined by the vertical line extending from such intersection, by the lower part of the swinging hypotenuse between the point of intersection and the point where the hypotenuse intersects the horizontal scale, and by the portion of the horizontal scale between the last-named point of intersection and the adjoining vertical side of the square.

The area of the square corresponds to the scale designations on both the vertical and horizontal fixed scales at the point where the lines defining this square intersect these scales. Thus the square area enclosed by the side of the small triangles between the sides of the large triangle and the opposite portions of the fixed scales may be generically represented as $a^2$, the corresponding fixed vertical and horizontal scales each giving a reading to show the value of $a$, and the diagonal of the small square having a scale associated therewith to show the value of $a^2$.

The small triangle between the upper part of the hypotenuse, the upper line of the small square and the adjoining portion of the vertical square has a base $a$ and an altitude which may be designated $b$, while the similar lower triangle has an altitude $a$ and a base which may be designated $c$. Employing these essential relationships of the similar triangles, many algebraic relationships of the various triangles and the square may be employed to effect the solution of various problems.

In the accompanying drawings,

Fig. 1 is a plan view of a calculating device in which the principles of the present invention are embodied;

Fig. 2 is a plan view of an optional form of such a device;

Fig. 3 is a diagram illustrating certain geometric relationships of the parts of my device; and Figs. 4, 5, 6 and 7 are diagrammatic views indicating the manner in which an apparatus of this character may be employed to solve typical problems.

First referring to Fig. 1 of the accompanying drawings, my improved calculating device preferably comprises a large and normally rigid frame or triangle 1. This frame may be formed in one or more parts, but preferably is arranged substantially to define a right triangle with horizontal and vertical edges at right angles to each other. The horizontal edge of the frame, as viewed in Fig. 1, may be provided with a fixed horizontal scale 11 having suitable graduations defining numerical divisions which afford an arithmetical scale with its zero end adjoining the right angle portion of the triangle 1. The vertical margin of the device has a similar, correspondingly graduated scale 12 with its zero point adjoining the right angle of the triangle. The scales 11 and 12 may conveniently have their zero points spaced for a purpose which will be explained later. These scales afford arithmetical measures of the dimensions of a triangle, the base of which is provided by the upper edge of scale 11 and the vertical leg of which is defined by an imaginary line A—A indicated in dot and dash lines in Fig. 1 extending upwardly from the zero point of scale 11.

A sliding scale 14 is disposed adjoining the fixed scale 11 and is similarly graduated, while a similar sliding scale 15 is similarly disposed adjoining the scale 12. When the scales 14 and 15 are slid inwardly, their zero points will coincide with the corresponding points on the scales 11 and 12.

A slider, designated in general by numeral 20, slides along the vertical leg of the triangle 1 and may be provided with a translucent or transparent panel through which readings may be readily made, the slider being provided with a horizontal index or hair line 21.

A pivot pin 24 is disposed with its axis at the intersection of the extension of the index line 21 and the line A—A referred to above. A swinging hypotenuse bar 25 is pivotally connected to the slider by the pin 24 and is adapted to extend over the scales 11 and 14. The pivot pin may be provided with a screw-threaded clamping head to permit the clamping of the bar 25 in any desired angular position in relation to the slider 20.

The triangular member 1 may be provided with a diagonal groove 30 which has parallel edges extending in the same general direction as a bisector of the right triangle of the member 1. As shown, one edge of the groove 30 may coincide with the line bisecting the angle between the upper edge of the scale 11 and the line A—A. The groove 30 may be undercut and receive a short sliding element 31 upon which a square 35 is carried, member 31 and the square cooperating to provide a right angled corner or point engageable with the inner edge of the hypotenuse 25. This edge of the hypotenuse is provided with a scale having graduations similar to those of the scales previously described with its zero point coinciding with the axis of pin 24.

The square 35 is provided with a vertical leg 37 and a horizontal leg 36 which may engage lugs 18 and 19, respectively, of the sliding scales 14 and 15. A graduated scale 30$^a$ is provided along the edge of the groove 30, i. e., along the bisector of the right angle at the juncture of the line A—A and the upper edge of scale 11. This diagonal scale preferably is provided with graduations corresponding to the squares of the corresponding values on the horizontal and vertical scales. Thus, for example, a vertical line from the scale 11 will intersect the diagonal scale 30$^a$ at a point corresponding to the square of the value on scale 11, from which the line is drawn. Thus, as shown, the outer edge of leg 37 of square 35 is on the value 5 of scale 11, and it meets the scale 30$^a$ at the value 25. Similarly the leg 36 extends over the scale 12 at the graduation mark designating 5. The zero point of the scale 30$^a$ is at the point of intersection of the upper edge of scale 11 and the line A—A.

The slider 20 may be provided with a protractor-like extension 50 which may be graduated similarly to an ordinary protractor to show the angle of the inner edge of the hypotenuse 25 that intersects the line 21 at the axis of pin 24 and the vertical line A—A.

In use, a devise of this character presents a system of three similar right triangles which may be varied in size and which may have their smaller supplementary angles varied as desired. This relationship is shown in Fig. 3 wherein one leg of the large right triangle coincides with a part of line A—A, the length of this leg or the altitude of the triangle being measured by the reading of the hair line 21 at its intersection with vertical scale 12. This triangle has a hypotenuse, the length of which is read by means of the scale on the swinging hypotenuse member 25 at the intersection of this scale with the upper edge of the horozontal scale 11. This large triangle has a base, the length of which is read on scale 11 at its intersection with the inner edge of hypotenuse 25.

Within this larger outer triangle are two smaller and similar triangles. One of these triangles, as shown in Fig. 3, has a horizontal leg defined by the upper edge of leg 36 of square 35, its hypotenuse defined by the portion of the inner edge of member 25 between this leg and the axis of the pivot pin, and its vertical leg defined by the portion of line A—A between said axis and the upper edge of leg 36. The length of the vertical leg of the smaller triangle may be directly obtained by reading the point of intersection of the hair line 21 upon sliding scale 15. The third triangle has a vertical side or altitude defined by the outer edge of leg 37 of the square, a base defined by the upper edge of scale 11 between that portion of the square and the inner edge of the hypotenuse, and its hypotenuse defined by the adjoining portion of the inner edge of the hypotenuse member 25. The length of the base of this triangle may be determined by a reading upon either the scale 11 at the intersection of its upper edge with the inner edge of hypotenuse 25 or directly below this point on scale 14.

The square 35 cooperates with the upper edge of scale 11 and with line A—A in enclosing a square, the area of which is indicated by the reading upon the scale 30$^a$ at the corner provided by the meeting of the outer edges of the legs of the square. Thus, as shown in Fig. 3, the square may be considered to have an area $a^2$, the value of $a^2$ being readily ascertainable by a reading from the scale 30$^a$ and the value of $a$ being determined by a reading either upon the scale 11 or scale 12 at the point of intersection of either of these scales with the outer edge of the corresponding leg of the square 35.

The upper small triangle accordingly has a horizontal leg with a dimension $a$ and a vertical leg which may be designated $b$, the length of which is readily determined by the reading upon the sliding scale 15 which registers with hair line 21. The other small triangle has a vertical leg with a dimension $a$ and a horizontal leg with a dimension herein denoted by the character $c$, which may be determined by a reading taken either upon the scale 11 or upon the scale 12, this reading indicating the distance between the intersection of leg 37 with the scale 11 and the point of intersection of the inner edge of hypotenuse 25 with the upper edge of scale 11.

The large right triangle has a base which is equal to $a+c$, and an altitude equal to $a+b$, the hypotenuse of this triangle having a length equal to $$\sqrt{2a^2+2ac+2ab+b^2+c^2}.$$

This value may be directly read upon the scale of the hypotenuse at its intersection with the upper edge of scale 11.

This device may be employed to solve a wide variety of arithmetical, algebraical and trigonometrical problems, various examples of which are described in my copending above-identified application. Accordingly only a few selected examples of such problems will be specifically described herein, it being understood that numerous other problems of various types may also be solved by this device.

Addition and subtraction may readily be performed by sliding the scale 15 in relation to scale 12 or by sliding the scale 14 in relation to the scale 11. Thus, for example, the scale 15 is in the position to show the sum of 5 as read upon the scale 12 and 7 as read upon the scale 15, the sum 12 being disposed under the hair line 21 on scale 12. These numbers are similarly in a position to show the difference between 12 and 7, 12 being read upon the scale 12, 7 being read on the scale 15, and the difference or answer being read upon the scale 15 at the intersection of the edge of bar 36 with the latter.

Obviously the square or square root of a number may be immediately ascertained by a comparison of the readings on the scale 30ª with the corresponding readings on the fixed vertical or horizontal scales.

A device of this character is advantageous in solving certain relationships which may be stated algebraically, for example, by the formula $$\frac{a^2}{d-a}=x.$$

Referring to Fig. 3, $d$ may equal $a+b$ so that $$\frac{a^2}{d-a}=\frac{a^2}{b}.$$

As previously explained, $$\frac{b}{a}=\frac{a}{c}$$

and $bc=a^2$, or $$\frac{a^2}{b}=c;$$

therefore $$\frac{a^2}{d-a}$$

must equal $c$. In the position of the parts shown in Fig. 1, $d=12$, $a^2=25$, $a=5$, the value of $$\frac{a^2}{d-a}$$

is approximately 3.6 as read on scales 11 or 14, this being roughly equal to 25 divided by 7.

A device of this character may also be employed to solve a relationship which may be stated algebraically by the formula $$\frac{d}{\sqrt{d}+e}=x.$$

Referring to Fig. 3, $d$ may equal $a^2$ and $$\sqrt{d}=a.$$

The member 35 therefore is set with its corner arranged to indicate $d$ on scale 30ª and with the legs 36 and 37 intersecting the scales 11 and 12 to indicate $$\sqrt{d}.$$

The slider 20 is then moved upwardly so that the distance from the horizontal leg of the square to the hair line 21 equals $$\sqrt{d}+e,$$

the reading being made on sliding scale 15. Thus, as shown by Fig. 3, $$\sqrt{d}+e=b,$$

and since $a^2=bc$, and $$\frac{a^2}{b}=c,$$

($a^2$ being equal to $d$, and $b$ being equal to $$\sqrt{d}+e),$$

therefore $$\frac{a^2}{b}=c, \text{ or } \frac{d}{\sqrt{d}+e}=c.$$

Therefore the answer is afforded by the graduation on scale 14 which is directly below the intersection of the inner edge of hypotenuse 25 with the upper edge of scale 11.

Certain types of quadratic equations may be solved with a device of this character as, for example, the equation $x^2-ax-b=0$, the method of solving such a problem being described without a detailed discussion of the reasons for making the various settings. The member 35 may be set so that $b$ is read at the point of its contact with member 25, and one of the sliding scales, as the scale 14, moved until $a$ is read on that scale at its intersection with the outer edge of the corresponding arm, as the arm 37, of member 35. The other sliding scale is maintained in the same relative position with the corresponding leg 36, as illustrated in Fig. 1. The reading upon each sliding scale corresponding to the point of intersection of the hypotenuse with the corresponding side of the large triangle will give the value of $x$ when the hypotenuse is so adjusted that both of the "$x$" readings are equal. For example, let it be assumed that $b=24.5$ and $a=3.5$. The parts of my device are set in the manner indicated above and the position of the readings giving the various values is shown by Fig. 4, $x$ having a value of 7 for the assumed values of $a$ and $b$. Various other methods may also be employed to solve equations of this general type.

The same general method of procedure may be varied to solve numerous cubic equations. Assume that the equation $x^3+ax^2-b=0$ is to be solved for $x$. This equation might be changed to read $x^2(x+a)=b$. The member 35 is then moved to a reading of $b$; $a$ is measured off by a sliding scale on one of the sides of the large triangle 1 and then the hypotenuse is set so that it affords a reading of $x$ beyond the reading of $a$ on that side of the triangle, and a reading of $x^2$ beyond the leg of the square 35 on intersecting the other edge of the triangle. For example, assume that $a=5.2$ and $b=25$. Fig. 5 illustrates the relative position of the parts of my device, the value of $x$ being found to be approximately 1.88 and of $x^2$, 3.53.

This device may also be employed for the convenient solution of various types of simultaneous equations, for example, assume that the following equations are to be solved for $x$ and $y$;

$$x+y=a$$
$$x^2+y^2=b$$

A length corresponding to $$\sqrt{b}$$

is measured off on the hypotenuse 25 and that hypotenuse is manipulated so that the sum of the two sides of the large triangle may equal $a$. Referring to the setting of the parts illustrated in Fig. 1 and employing only approximate values, let it be assumed that $a=20.6$ and that $b=216$ and $$\sqrt{b}=14.7;$$

the distance equal to $$\sqrt{b},$$

namely 14.7, is measured off on hypotenuse 25; the latter is maneuvered until the sum of the readings on horizontal scale 11 and vertical scale 12 are equal to $a$ or 20.6. Thus, the horizontal reading equals 8.6 and the vertical reading equals 12 or a total of 20.6. The horizontal reading of the scale 11 thus gives a value of one of the unknown quantities, approximately 8.6, while the vertical reading on scale 12 gives the value of the other quantity, namely 12. Thus $x$ may be equal to 8.6 and $y$ may be equal to 12 or vice versa. Fig. 6 illustrates the values afforded by such a setting.

Various involved expressions may also be solved by following methods of the same general type as have been described. For example, assume that the equation $$x=\sqrt{A^2+B^2}$$

is to be solved. A may be measured off on one of the fixed scales of the large triangle and B on the other fixed scale. Then the hypotenuse extending between these readings will afford a direct reading of $$\sqrt{A^2+B^2}.$$

Thus, employing approximate values and referring to the setting illustrated in Fig. 1, let $A=12$ and $B=8.6$. The hypotenuse, being set to complete a triangle with sides of these dimensions, affords a reading of approximately 14.7, which gives the approximate value of $x$.

If it is desired to solve such an equation as $$x=\sqrt{(A-B)^2+C^2},$$

the same general procedure may be followed. For example, the value of C may be read along one fixed scale upon the large triangle and the value of A−B may be read on the other leg of the triangle. Then the hypotenuse intersecting the scales at the points of these readings gives a direct indication of the value of $x$ or of $$\sqrt{(A-B)^2+C^2}.$$

Again referring to the setting illustrated in Fig. 1 and employing approximate values, let it be assumed that $A=14$, that $B=2$, and that $C=8.6$. The hypotenuse is set to intersect the horizontal scale 11 at the point corresponding to 8.6, while B is subtracted from A; $14-2=12$ and the other end of the hypotenuse is set so that the line 21 is over the marking for 12 on scale 12. Then hypotenuse 25 gives a direct reading for the value of $x$, namely 14.7, as indicated in Fig. 7.

Fig. 2 illustrates a device of the same general character as shown in Fig. 1 but without the square 35. This device comprises a substantially triangular member 1ª having fixed scales 11 and 12 and sliding scales 14 and 15 of the same type as already described and having a slider 20 and a hypotenuse 25 arranged in the same manner as described with reference to Fig. 1. A narrow diagonal groove 30ᵇ may be disposed in the body of this device to provide an edge coinciding with the bisector of the angle between the line A—A and the upper edge of scale 11. For this purpose a scale of squares 30ᶜ is marked on the body of the member 1 in the same general manner as described with reference to Fig. 1. In the groove 30ᵇ a narrow slider 50 may be arranged with a corner portion to engage the inner edge of hypotenuse 25, thus accurately to position the corner of the small square defined by this device. The body portion of the member 1 is provided with horizontal and vertical graduations or lines extending from the graduations upon the fixed scales 11 and 12, thus giving a coordinate effect. In practice these lines may conveniently be scored in the material of the frame 1. These horizontal and vertical lines may be followed to determine the relationship between readings on the fixed horizontal and vertical scales and the diagonal square scale or scale 30ᶜ.

I claim:

1. Apparatus of the class described comprising a frame having a pair of fixed scales at right angles to each other, a slider movable along one of said scales, a sliding scale substantially parallel to and adjacent each of the fixed scales, a swinging hypotenuse member pivoted to the slider, a guideway provided by the frame and extending at an angle of 45° to one of said scales, a part slidable along said guideway and engageable with the hypotenuse member and a diagonal scale associated with the guideway and having a zero point adjoining the intersection of the edge of one of said fixed scales and of a line at right angles to said edge extending through the axis about which the swinging hypotenuse is pivoted, said diagonal scale being graduated to give readings of values equal to the squares of corresponding readings upon one of the fixed scales.

2. Apparatus of the type specified in claim 1 also comprising means extending from said diagonal scale and at right angles to the fixed scales to facilitate the reading of corresponding values on the diagonal scale and either of the fixed scales.

3. Apparatus of the class described comprising a frame provided with a pair of fixed scales at right angles to each other, a slider movable along one of said scales, a swinging hypotenuse member pivoted to the slider, a guideway provided by the frame and extending at an angle of 45° to one of said scales, a part slidable along said guideway and having a point of contact with the edge of the hypotenuse member, a fixed diagonal scale on the frame having an edge coinciding with the path of said point upon the said part, said diagonal scale being graduated to afford readings of the squares of values upon the fixed scales.

4. Apparatus of the type specified in claim 3 arranged with said diagonal scale having its zero graduation at the intersection of scale lines afforded by one of said fixed scales and by a line at right angles to said scale line extending through the pivotal axis about which the hypotenuse member slides.

5. Apparatus of the class described comprising a frame provided with a pair of fixed scales at right angles to each other, a slider movable along one of said scales, a swinging hypotenuse member pivoted to the slider, a guideway provided by the frame and extending at an angle of 45° to one of said scales, a part slidable along said guideway and having a point of contact with the edge of the hypotenuse member, a fixed diagonal scale on the frame having an edge coinciding with the path of said point upon the said part, said diagonal scale being graduated to afford readings of the squares of values upon the fixed scales, and legs carried by said part and extending outwardly from said point of contact at right angles to each other and at right angles to the fixed scales to cooperate with the latter in defining a square, the diagonal of which is measured by said diagonal scale.

6. Apparatus of the class described comprising a frame provided with a pair of fixed scales at right angles to each other, a slider movable along one of said scales, a swinging hypotenuse member pivoted to the slider, a guideway provided by the frame and extending at an angle of 45° to one of said scales, a part slidable along said guideway and having a point of contact with the edge of the hypotenuse member, a fixed diagonal scale on the frame having an edge coinciding with the path of said point upon the said part, said diagonal scale being graduated to afford readings of the squares of values upon the fixed scales, and marking lines upon the said frame extending at angles of 45° to said diagonal scale and at right angles to said fixed scales, said lines being arranged to extend between indications of values on the fixed scales and indications of squares of those values on the diagonal scale.

7. Apparatus of the class described comprising a frame provided with a fixed horizontal scale and a fixed vertical scale, a guideway extending at an angle of 45° to one of said fixed scales and intersecting the zero point of the latter, a diagonal scale extending along the guideway with its zero point coinciding with that of the last-named fixed scale, said diagonal scale affording readings of the squares of the numbers upon the horizontal and vertical fixed scales, a slider movable along said guideway, and indicating means to show the position of the slider relative to the graduations upon the horizontal and vertical fixed scales, respectively.

8. Apparatus of the class described comprising a frame provided with a fixed horizontal scale and a fixed vertical scale, a guideway extending at an angle of 45° to one of said fixed scales and intersecting the zero point of the latter, a diagonal scale extending along the guideway with its zero point coinciding with that of the last-named fixed scale, said diagonal scale affording readings of the squares of the numbers upon the horizontal and vertical fixed scales, a slider movable along said guideway, a support slidable along the vertical fixed scale, a hypotenuse member pivoted to said support and adapted to swing into engagement with the slider, and indicating means to show the position of the point of contact of the slider and hypotenuse member relative to the graduations on the horizontal and on the vertical fixed scales, respectively.

9. Apparatus of the class described comprising a frame provided with a fixed, graduated horizontal scale and a fixed, graduated vertical scale, a pair of similarly graduated slidable scales adjoining the fixed scales, a support slidable along one of said fixed scales, a swinging hypotenuse member pivoted to the support, a guide provided by the frame and extending at an angle of 45" to said fixed scales, a slider movable along said guide and having a point of contact with the hypotenuse member, indicating means to show the position of the point of contact of the slider and hypotenuse member relative to the graduations on the horizontal and vertical scales respectively, and a fixed scale to afford readings of squares of numbers indicated by graduations upon the fixed horizontal and vertical scales.

BARRETT R. WELLINGTON.